US011798066B2

(12) United States Patent
Cecchi et al.

(10) Patent No.: US 11,798,066 B2
(45) Date of Patent: Oct. 24, 2023

(54) VIRTUAL SIGNING EVENTS

(71) Applicants: Lauren R. Cecchi, Madison, CT (US); Michael D. Cecchi, Longboat Key, FL (US); Kudakwashe M. Biza, Madison, NJ (US)

(72) Inventors: Lauren R. Cecchi, Madison, CT (US); Michael D. Cecchi, Longboat Key, FL (US); Kudakwashe M. Biza, Madison, NJ (US)

( * ) Notice: Subject to any disclaimer, the term of this patent is extended or adjusted under 35 U.S.C. 154(b) by 111 days.

(21) Appl. No.: 17/376,981

(22) Filed: Jul. 15, 2021

(65) Prior Publication Data

US 2022/0020081 A1    Jan. 20, 2022

Related U.S. Application Data

(60) Provisional application No. 62/705,799, filed on Jul. 16, 2020.

(51) Int. Cl.
| | | |
|---|---|---|
| *G06Q 30/06* | (2023.01) | |
| *G06Q 30/0601* | (2023.01) | |
| *G06Q 30/08* | (2012.01) | |
| *G06Q 50/00* | (2012.01) | |
| *G06T 19/00* | (2011.01) | |
| *G06Q 10/0833* | (2023.01) | |
| *H04N 7/14* | (2006.01) | |
| *G06Q 10/0631* | (2023.01) | |

(52) U.S. Cl.
CPC . *G06Q 30/0643* (2013.01); *G06Q 10/063114* (2013.01); *G06Q 10/0833* (2013.01); *G06Q 30/08* (2013.01); *G06Q 50/01* (2013.01); *G06T 19/006* (2013.01); *H04N 7/141* (2013.01)

(58) Field of Classification Search
CPC ............... G06Q 30/0643; G06Q 30/08; G06Q 10/0833; G06Q 10/063114; G06Q 50/01; H04N 7/15; H04N 7/141; G06T 19/006
USPC ........................................................ 705/27.2
See application file for complete search history.

(56) References Cited

U.S. PATENT DOCUMENTS

| | | | | |
|---|---|---|---|---|
| 10,250,649 | B2 * | 4/2019 | Winawer | H04L 65/1073 |
| 2003/0046543 | A1 * | 3/2003 | Houston | H04L 63/126 |
| | | | | 713/176 |
| 2003/0220885 | A1 * | 11/2003 | Lucarelli | G06Q 30/06 |
| | | | | 705/64 |

(Continued)

FOREIGN PATENT DOCUMENTS

WO    WO-2012012894 A1 *  2/2012    ......... G06Q 30/0627

OTHER PUBLICATIONS

Talk2Legends Launches Mobile App, Enables Video Chat Between Fans and Celebrities; Internet Wire Nov. 17, 2015: NA.; retrieved from Dialog on Feb. 6, 2023 (Year: 2015).*

(Continued)

*Primary Examiner* — Yogesh C Garg
(74) *Attorney, Agent, or Firm* — Merchant & Gould P.C.

(57) ABSTRACT

An example virtual signing even can include to establish a first video connection with the celebrity; establish a second video connection with a customer; connect the first video connection to the second video connection to facilitate a virtual face-to-face interaction between the celebrity and the customer; confirm signing of at least one item by the celebrity during the virtual face-to-face interaction; and facilitate shipping of the at least one item to the customer.

9 Claims, 13 Drawing Sheets

(56) References Cited

U.S. PATENT DOCUMENTS

| | | | |
|---|---|---|---|
| 2006/0221195 A1* | 10/2006 | Sohmers | H04N 21/812 |
| | | | 725/78 |
| 2007/0050264 A1* | 3/2007 | Lewis | G06Q 30/06 |
| | | | 705/26.1 |
| 2009/0112680 A1* | 4/2009 | Dovrath | G06Q 30/08 |
| | | | 705/26.1 |
| 2011/0161487 A1* | 6/2011 | O'Sullivan | H04L 41/5067 |
| | | | 709/227 |
| 2014/0143033 A1* | 5/2014 | Cecchi | B65D 75/36 |
| | | | 428/80 |
| 2018/0025415 A1 | 1/2018 | Engel et al. | |

OTHER PUBLICATIONS

Zeidler, Sue, "Star gazers can go online to rub shoulders with celebs"; Leader Post [Regina Sask] May 24, 2008; b.3. retrieved from Dialog on Sep. 5, 2023 (Year: 2008).*

Baron App, Inc. DBA Cameo, "Personalized videos feat. your favourite stars", www.cameo.com, copyright 2017-2021, 4 pages.

Fanmio Inc., "Fanmi—A whole new way to meet your heros", www.fanmio.com, accessed Jul. 15, 2021, 2 pages.

* cited by examiner

VIRTUAL SIGNING EVENTS

BACKGROUND

There are millions of collectibles, memorabilia, and autographed items, such as pictures, jerseys, baseball cards and the like, available on Internet sites worldwide. Individuals, such as celebrities, athletes, actors, personalities and performers, are asked to participate in signing events to sign these items. Typically, the signing events take place behind closed doors at locations without fans being present. Other signing events may involve in-person meetings at a determined time and location. These individuals sign items (memorabilia and products) and sell the items directly to companies who then resell the items online and/or at other events. Examples of where these items are sold include fan shops, auction sites, and charity sites. The items are also sold from the companies directly to fans at tradeshows, award shows and sports events.

SUMMARY

In one aspect, a system whereby an individual applies a signature to a memorabilia item can include: a processor; memory encoding instructions which, when executed by the processor, cause the processor to: establish a first video connection with the individual; establish a second video connection with a customer; connect the first video connection to the second video connection to facilitate a virtual face-to-face interaction between the individual and the customer; confirm signing of at least one item by the individual during the virtual face-to-face interaction; and facilitate shipping of the at least one item to the customer.

In another aspect, a method for commercializing items associated with a celebrity can include: defining a session for interaction with the celebrity by a designated user; offering the session for sale via an internet website; accepting an offer from a customer; and scheduling the session with the customer such that said celebrity is obligated to interact with the user during the session.

In yet another aspect, a method of fulfilling memorabilia requests can include: (a) providing a list of celebrities, each celebrity having associated memorabilia; (b) prompting a customer to request memorabilia from one of the celebrities and to provide customization information; (c) receiving the memorabilia request and the customization information; (d) adding the memorabilia request to a work queue of the celebrity associated with the requested memorabilia; (e) verifying if the requested memorabilia has been fulfilled by the associated celebrity using the provided customization information; (f) if the memorabilia request has been fulfilled, delivering the requested memorabilia to the customer; and (g) if the memorabilia request has not been fulfilled, returning to step (e).

In another aspect, a method whereby an individual applies a signature to memorabilia can include: establishing a direct interaction with the customer via a webcam/internet/video at a predetermined time in real time not recorded; allowing the individual to apply a signature to the memorabilia, item or product; allowing the individual to interact with the customer real-time as the signature is applied to the memorabilia, item or product; allowing the individual to place a connotation and/or name, at the customer/customer's request; allowing the individual to display the autographed item to the customer via webcam/internet/video to show authenticity; shipping the autographed item directly to the customer/customer after the webcam/internet/video.

DETAILED DESCRIPTION

Figure 1:
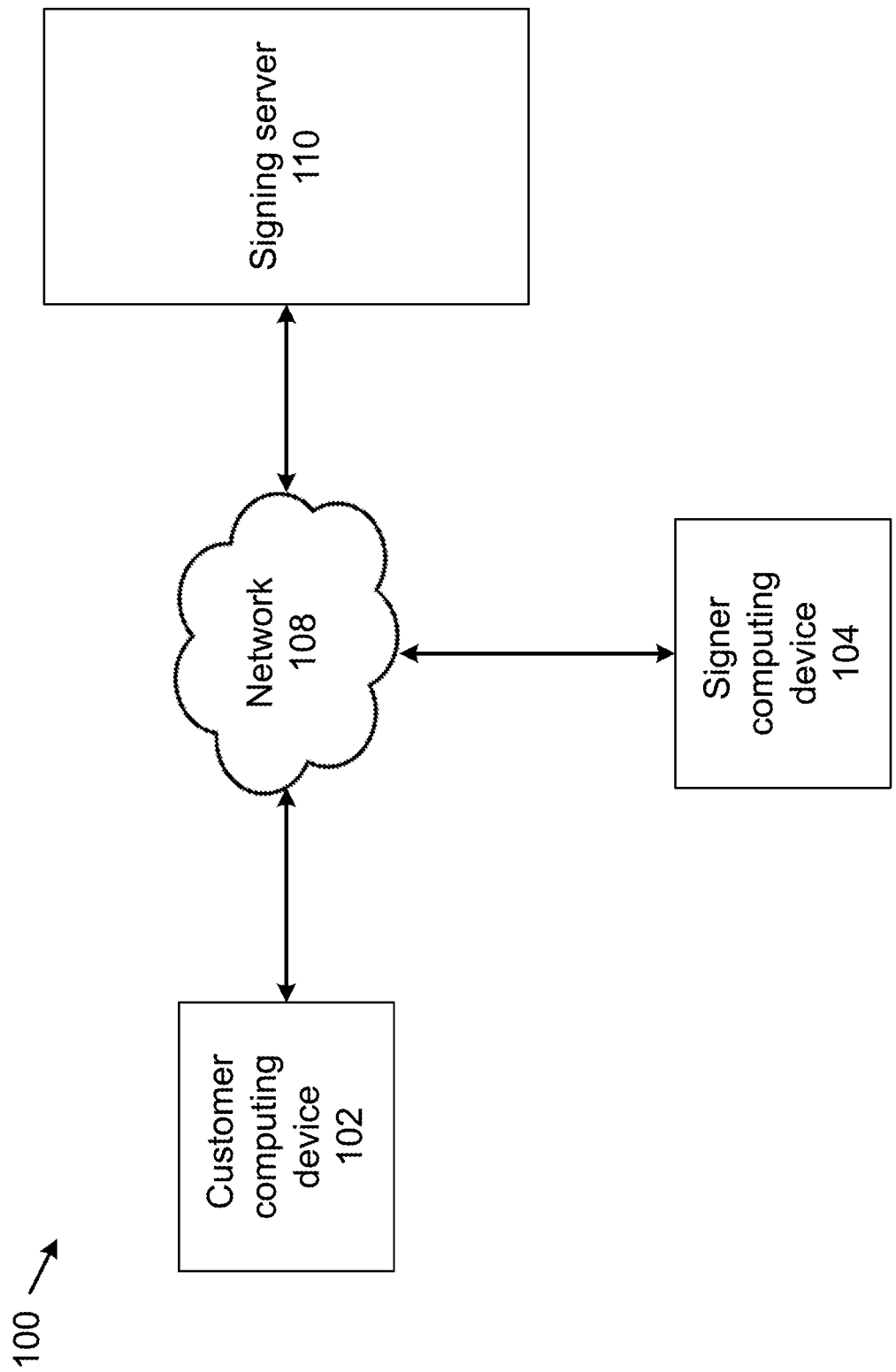
FIG. 1 shows an example system for facilitating a virtual signing event.

Embodiments disclosed herein relate to the signing of items through a virtual face-to-face interaction between an individual ("signer") who signs the items and customers of those items at a virtual signing event. In such examples, the item is signed and displayed to the customer in real time during the virtual interaction. In some embodiments, the signature can be customized to include the customer's name and/or other aspects unique to the customer, etc. The signer and customer can exchange dialogue and visual activities. This creates camaraderie between the customer and signer during the virtual interaction, whereby the signer and customer may interact with audible and/or hand displays, such as a virtual 'high five', 'peace sign', or the like.

The product is then packaged and shipped to customer as a keepsake. The technology is advantageous in its timing of the value of the signer at the time the signing occurs. In this manner, the customer receives the item that was actually autographed by the signer in the virtual interaction, thereby simulating an actual in-person signing event.

In the examples provided herein, the signer can be, without limitation, a celebrity, personality, athlete, artist, musician, chef, author, influencer, Youtuber, professional, fictional character, or other individual whose signature is desirable to obtain. Examples of the items that can be signed include, without limitation: memorabilia, jerseys, footballs, soccer balls, baseballs, baseball bats, helmets, t shirts, hats, CDs, records, posters, printed images, framed images, movie and TV scripts/manuscripts, props from movie and tv sets, items relating to characters (e.g., sword for Jon Snow for Game of Thrones), action figures, dolls, drinkware, books, kitchen appliances, and/or literally anything else holding value to the customer and/or signer. The customer can be an individual or other entity wishing to purchase the item and/or the time of the signer during the virtual interaction.

As described further herein, the signer and customer can be located anywhere in the world. The virtual signing event happens over a computer network like the Internet/world wide web and can involve items that a pre-purchased and/or purchased by the customer at the time of signing during the virtual signing event.

In the examples provided below, the virtual signing event can take one or more various forms. In one virtual signing event format described further below, there is a live broadcast of the virtual signing event. Those customers who are receiving items with signatures can access the event virtually. In addition, spectators can watch as the signer signs and interacts with the customers during the virtual signing event.

For instance, the virtual signing event can be streamed live on a platform such as Facebook Live. Customers and spectators can access the virtual signing event. In some instances, the customers have enhanced privileges during the virtual signing event, such as being able to interact (e.g., speak) with the signer as the signer signs the customer's item(s).

In another virtual signing event format, the customer is connected directly with the signer in a one-on-one or private virtual signing event. In this format, the customer may wait in a virtual waiting room until a designated time or slot is available. The customer is then connected with the signer so that the customer can watch the item being signed and possibly interact with the signer.

Similarly, in yet another virtual signing event format, multiple individuals are connected to the signer during the virtual signing event. For instance, the customer may be allowed to invite a certain number of family and/or friends to connect and watch/participate in the virtual signing event. In such scenarios, the customer and others can watch the item being signed and possibly interact with the signer. Other configurations are possible.

During a virtual face-to-face interaction with a customer, the signer can provide a signature and/or customize a message, recognize the item being signed and sign in real time virtually. The virtual signing event can also provide the ability to have moderated conversations between the signer and the customer before, during, and/or after signing. After the signing is complete, that specific item is shipped directly to the customer. A note (sometimes personalized by the signer) can be provided in the package to the customer as well. A certificate of authenticity can also be provided.

This virtual face-to-face interaction increases the opportunity for the customer to purchase more products. The signer and the customer can interact in a more informal and friendlier basis in the virtual face-to-face interaction, whereby the signer may be able to influence the purchasing of the customer. The customer may therefore purchase more during this interaction.

The signer can also optimize time usage through multiple time windows of direct sales, with customers, with less or no travel. An advantage is that the signer participating in the virtual signing event will be able to conduct the virtual face-to-face interaction anywhere of the signer's choosing. Travel is not typically necessary, and the virtual signing events can happen within the signer's home or other preferred location (e.g., at an office or studio/production set). An advantage of this disclosure is that this creates an atmosphere, that the products that the customers are receiving are 'new and fresh' and personal to them.

Further, the virtual signing event addresses other concerns, such as the inability to meet face-to-face in person because of a pandemic (i.e., the current spread of a novel Coronavirus (COVID-19)). This has greatly diminished the face-to-face interaction with signers. The virtual signing event addresses such an issue by allowing the virtual face-to-face interaction without unnecessarily exposing the signer or the customer.

Referring now to FIG. 1, an example block diagram depicting of a system 100 for facilitating a virtual signing event is shown. As illustrated, the system 100 includes a customer computing device 102 and a signer computing device 104 that each communicates with a signing server 110 over a network 108, such as a local area network, wide area network, a wireless or cellular communication network, or the like. The signing server 110, in turn, facilitates communication between the customer computing device 102 and the signer computing device 104 during the virtual signing event.

In this example, the customer computing device 102 and the signer computing device 104 can capture media, such as audio and video, to facilitate the virtual face-to-face interaction. For instance, the customer computing device 102 can be a mobile device like a smart phone, tablet, laptop, or the like. The customer computing device 102 can also be a desktop or similar computer.

In this example, the customer computing device 102 includes a client application that accesses a camera and microphone to capture media content including audio and video. Although a single customer computing device 102 is shown, many hundreds or thousands of computing devices can capture and send media content to the signing server 110. Further, although a single signing server 110 is shown, multiple computing devices can be used to implement the signing server 110, such as through cloud computing.

In the example shown, the customer computing device 102 and the signer computing device 104 each uses a software application to facilitate the virtual face-to-face interaction with both video and audio (e.g., voice-over-internet-protocol). Examples of software applications that can be used include Zoom, Skype, Facebook Messenger, etc.

Any of these software applications allows two or more individuals to communicate in real time using audio and video. For instance, the software applications can allow multiple video streams to be shown on a display, such as a first video stream of the signer and a second video stream of the customer. Other video conferencing platforms or technologies can be used. In alternative embodiments, only audio (e.g., telephone) is provided between the signer and the customer. In yet other alternatives, text messaging or other forms of communication are provided.

In addition to the cameras and microphones, the customer comping device 102, the signer computing device 104, and/or the signing server 110 can include one or more sensor devices that provide additional information. In alternative embodiments, the computing devices can provide location information from global positioning system (GPS) sensor associated with the customer to the signer so that the signer can provide location-relevant conversation to the customer. In yet another embodiment, a GPS sensor associated with the signer captures the location of the signer during signing of the item. The location information can be stored by the signing server 110 and incorporated as part of the certificate of authenticity associated with the item. Other configurations are possible.

Figure 2:
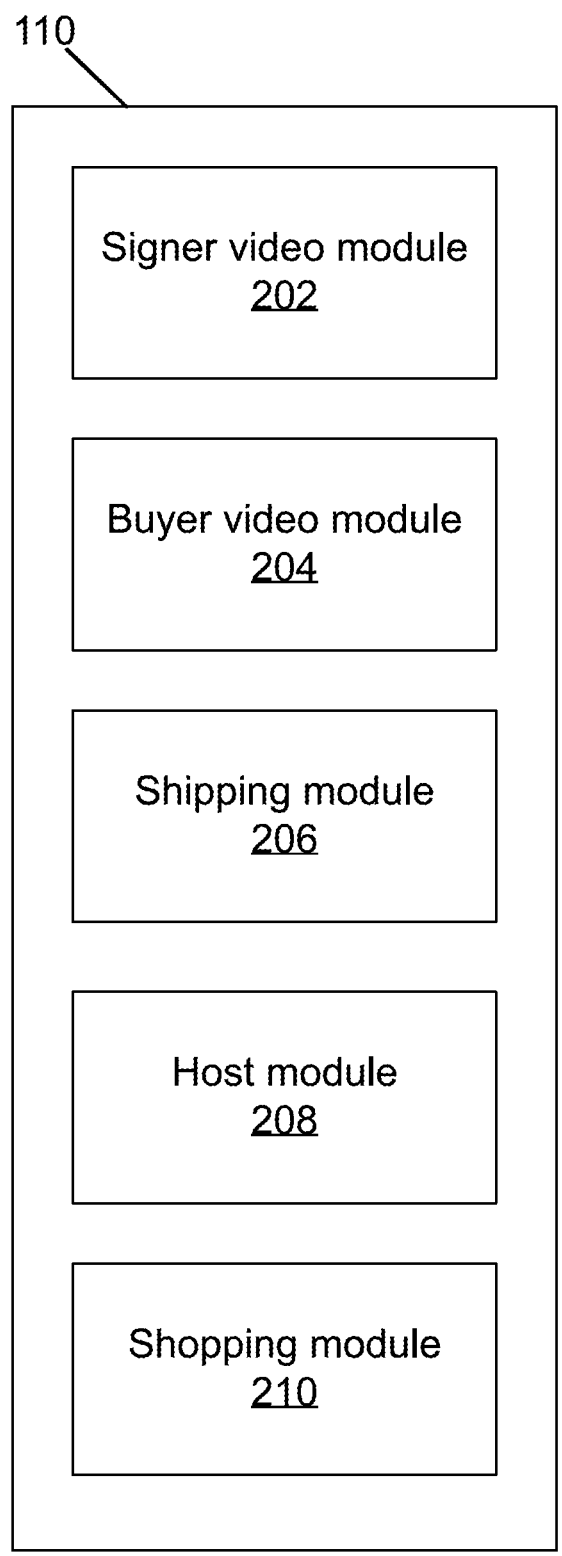
FIG. 2 shows example logical components of a signing server of the system of FIG. 1.

Referring now to FIG. 2, additional details are shown about the logical components of the signing server 110. The example signing server 110 includes a signer video module 202, a customer video module 204, and a shipping module 206.

In the example shown, the signer video module 202 and the customer video module 204 facilitate the virtual face-to-face interaction between the signer computing device 104 and the customer computing device 102. In this example, the signing server 110 can be a web site that allows the signer to log into the web site to initiate the virtual signing event. Thereupon, customers can log into the web site hosted by the signing server 110 and be connected by the signer video module 202 and customer video module 204 to facilitate the virtual face-to-face interaction.

More specifically, a camera of the customer computing device 102 can be used to capture video that is transmitted to the signer computing device 104 and vice versa. When a virtual signing event is conducted (as described further below), the signer video module 202 and the customer video module 204 facilitate the connection that allows the video feeds to occur, thereby allowing the virtual face-to-face interaction. In some examples, the customer is placed in a waiting room until the signer is ready. This can be a first-come, first-served scenario and/or an appointment-based scenario where the customer waits for a specific timeslot with the signer. Such a timeslot can be selected as part of the process of pre-purchasing the item or be completed separately.

The example shipping module 206 is programmed to facilitate the shipment of the item or items that are signed during the virtual signing event to the customer. The shipping module 206 is programmed to store the customer's location information (e.g., home or work address) so that the items can be shipped properly. The shipping module 206 can also store a Globally Unique Identifier or other identifier associated with the item. This allows the customer to assure that the item that is shipped is the same item that was signed during the virtual face-to-face interaction. The shipping module 206 can track this identifier.

In some embodiments, the signing server 110 can also include a host module 208 that virtually facilitates the interaction of the customer during the virtual signing event. For instance, the signing server 110 can facilitate the virtual connection of a host with the customer prior to and/or after the signer signs the item. In one example provided in more detail in FIG. 4 below, the host module allows the host to greet the customer when the customer connects, explain the process to the customer as the customer waits in the virtual waiting room, and/or sell items to the customer prior to meeting with the signer. In addition, the host module 208 can allow the host to virtually meet with the customer after the signing, explain how the signed item(s) will be delivered, and possibly assist the customer in purchasing additional items.

In some instances, the virtual signing event can include multiple signers, such as members of a band, actors on a hit television show, etc. In this instance, the customers may be able to interact with the signers individually. In such a scenario, the host module 208 can facilitate the ushering of the customer from a first signer, to a waiting room, to a second signer, to another waiting room, and so on until all the signers have been met.

In one embodiment, the host is a human that interacts through video and/or audio with the customer through a computing device. In another embodiment, the host is semi- or fully-automated, such as a virtual assistant that provides information. In some examples, the virtual assistant can use artificial intelligence to learn over time, thereby providing additional services and information to the customers at the virtual signing events.

In some embodiments, the signing server 110 can also include a shopping module 210. The shopping module facilitates the sale of items to the customer before, during, and/or after meeting with the signer during the virtual signing event. For instance, the shopping module 210 can provide an online shop that allows the customer to view and purchase items for signing before or during the virtual meeting with the signer. Further, the shopping module 210 can include items that have been pre-signed, or the customer can purchase additional items and request another virtual signing event with the signer at a future time.

Figure 3:
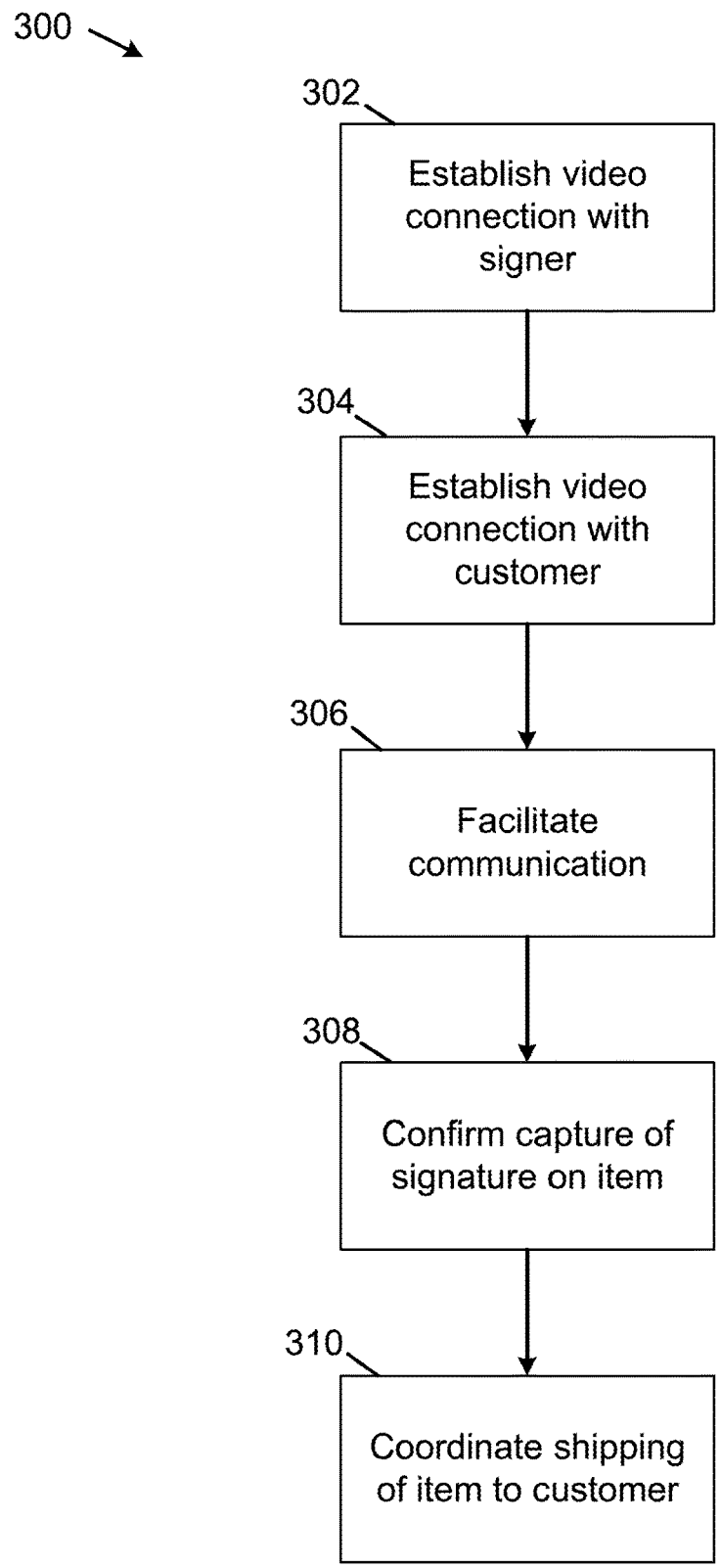
FIG. 3 shows an example method for facilitating a virtual signing event.

Referring now to FIG. 3, an example method 300 for facilitating the virtual signing event is shown. Although example steps are shown, the steps can be performed in a different order, and fewer or more steps can be performed for the virtual signing event.

Initially, at step 302, a video connection is established with the signer. This can be accomplished, for instance, by allowing the signer to log into the server hosting the event. In another example, the event provides the computing device(s) at a specified location for the virtual signing event. The signer can simply travel to that location.

Next, at step 304, a video connection is established with the customer. As noted, this can be accomplished by allowing the customer to log into the server hosting the event. In some instances, multiple customers log into the server for a group event. Or, the server can stage customers so that each customer is connected at an appropriate time to the signer for the virtual face-to-face interaction.

Next, at step 306, the virtual face-to-face interaction is facilitated by connecting the video from the signer with the video from the customer. As noted, this can be a one-on-one interaction or a many customers to one or more signers interaction.

Next, at step 308, the customer can interact and confirm the signing of the desired item by the signer. During or prior to this process, the customer can select one or more items for the signer to sign. For example, the customer can purchase an item before the virtual face-to-face interaction. Also, the signer or an assistant of the signer can offer to sell the customer additional items during the virtual signing event and/or virtual face-to-face interaction.

In these examples, the system 100 can facilitate the sale of the item to the customer. In other examples, the signing server 110 can be programmed to accept credit cards, EFT, redeemable internet currency (e.g., Bitcoin), and/or other forms of payment and provide receipts confirming the same to the customer.

In some examples, the items are provided or sold for a specified price. In another example, the item is offered at a predetermined price, and bidding is facilitated to a highest price within a predetermined time frame initiated by a first offer being made, and/or bidding is facilitated to a highest price within a predetermined time frame initiated by the session being posted. This can be conducted, for example, in an auction format.

Finally, at step 310, the item is shipped to the customer. The system can track the shipping information so that the item is automatically packaged, labeled, and shipped to the customer in an automated, efficient fashion.

Figure 4:
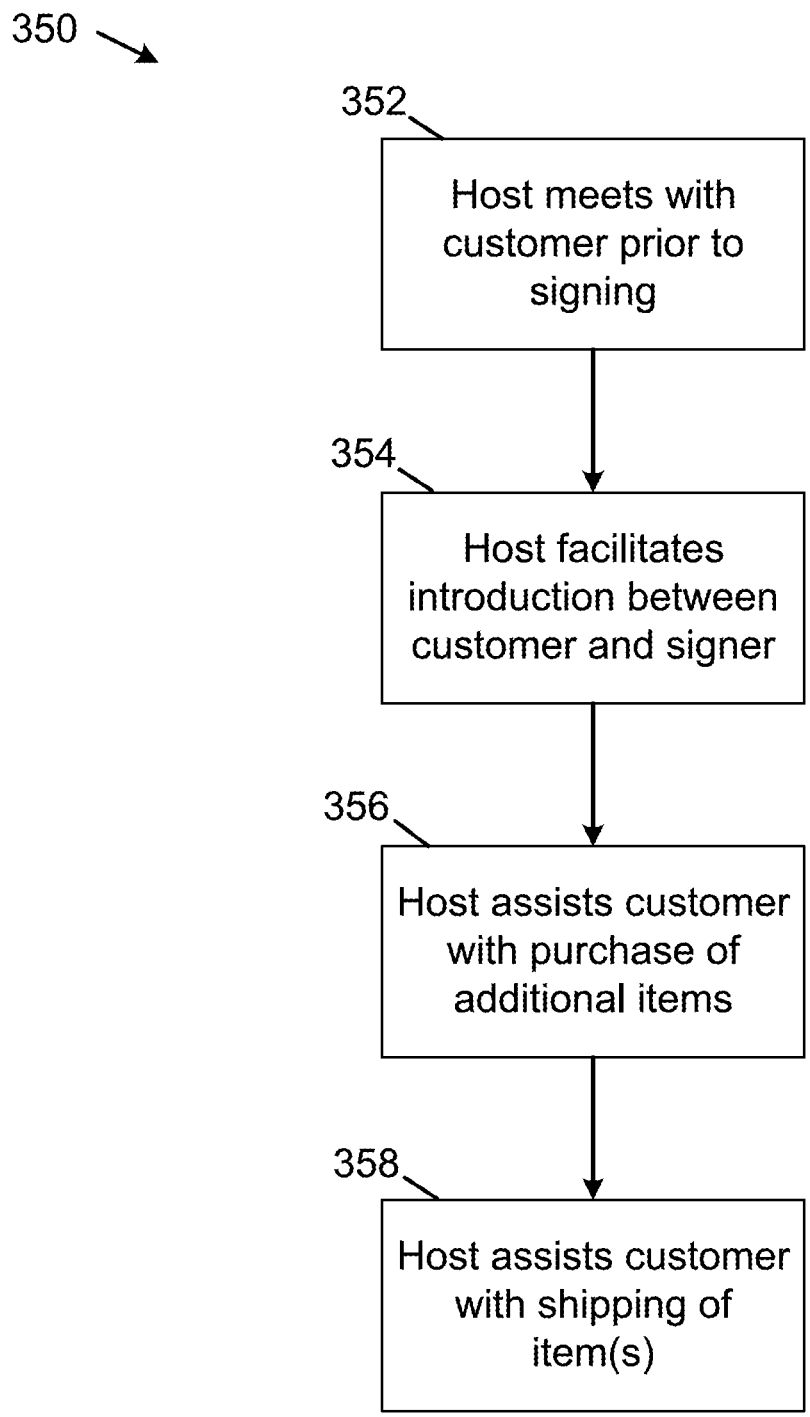
FIG. 4 shows an example method for a host to facilitate a virtual signing event.

FIG. 4 shows an example method 350 for the host facilitating the virtual signing event for the customer. Although example steps are shown, the steps can be performed in a different order, and fewer or more steps can be performed for the virtual signing event.

Initially, at step 352, the host meets virtually with the customer prior to the signing. This can happen, for instance in the waiting room after the customer logs into the signing server. The host can be connected by video with the customer to explain the process, answer questions, and/or sell additional items to the customer for the signing.

Next, at step 354, the host can optionally introduce the customer to the signer when the customer is connected to the signer. For instance, the host can be connected in a three-way video conference with the customer and the signer to facilitate the introduction. The host can then exit the video conference to allow the customer and signer to interact directly.

At step 356, the host can assist the customer in purchasing items for signature before, during, and/or after meeting with the signer. For instance, the host can be re-connected with the customer after the signer is finished to discuss how the virtual event went and potentially assist the customer in purchasing additional items. In a multi-signer scenario as described above, the host can also facilitate the transitions of the customer between signers and waiting rooms.

Next, a step 358, the host can answer other questions and assist the customer in the shipping of the signed items. For instance, the host can confirm the shipping address and method and collect any further needed information.

Figure 5:
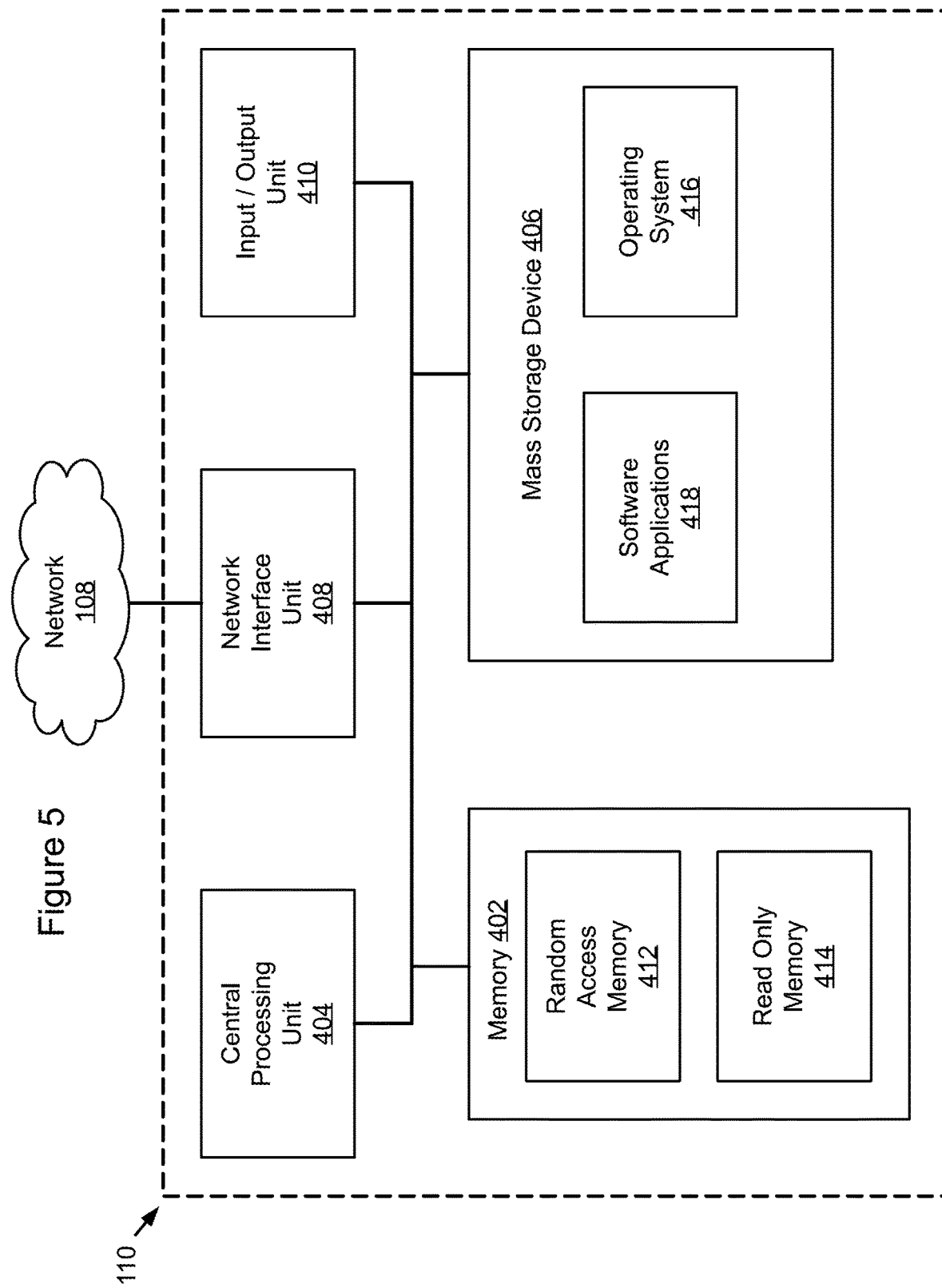
FIG. 5 shows an example components of the signing server of FIG. 2.

Referring now to FIG. 5, in the examples provided, the various components of the signing server 110 can be implemented on one or more computing devices. The computing devices can be configured in various ways, such as the traditional client/server configuration.

Each computing device can include various components, including a memory 402, a central processing unit (or processor) 404, a mass storage device 406, a network interface unit or card 408, an input/output unit 410 (e.g., video interface, a display unit, and an external component interface). In other embodiments, computing devices are implemented using more or fewer hardware components. For instance, in another example embodiment, a computing device does not include a video interface, a display unit, an external storage device, or an input device.

The term computer readable media as used herein may include computer storage media, which can include random access memory 412 and/or read only memory 414. Computer storage media may include volatile and nonvolatile, removable and non-removable media implemented in any method or technology for storage of information, such as computer readable instructions, data structures, program modules, or other data. The memory includes one or more computer storage media capable of storing data and/or instructions.

As used in this document, a computer storage medium is a device or article of manufacture that stores data and/or software instructions readable by a computing device. In different embodiments, the memory is implemented in different ways. For instance, in various embodiments, the memory is implemented using various types of computer storage media. Example types of computer storage media include, but are not limited to, dynamic random access memory (DRAM), double data rate synchronous dynamic random access memory (DDR SDRAM), reduced latency DRAM, DDR2 SDRAM, DDR3 SDRAM, Rambus RAM, solid state memory, flash memory, read-only memory (ROM), electrically-erasable programmable ROM, and other types of devices and/or articles of manufacture that store data.

The processing system includes one or more physical integrated circuits that selectively execute software instructions. In various embodiments, the processing system is implemented in various ways. For example, the processing system can be implemented as one or more processing cores. In this example, the processing system can comprise one or more Intel microprocessors. In another example, the processing system can comprise one or more separate microprocessors.

The secondary storage device includes one or more computer storage media. The secondary storage device stores data and software instructions not directly accessible by the processing system. In other words, the processing system performs an I/O operation to retrieve data and/or software instructions from the secondary storage device. In various embodiments, the secondary storage device is implemented by various types of computer-readable data storage media. For instance, the secondary storage device may be implemented by one or more magnetic disks, magnetic tape drives, CD-ROM discs, DVD-ROM discs, Blu-Ray discs, solid state memory devices, Bernoulli cartridges, and/or other types of computer-readable data storage media.

The network interface card enables the computing device to send data to and receive data from a communication network. In different embodiments, the network interface card is implemented in different ways. For example, in various embodiments, the network interface card is implemented as an Ethernet interface, a token-ring network interface, a fiber optic network interface, a wireless network interface (e.g., Wi-Fi, WiMAX, etc.), or another type of network interface.

The video interface enables the computing device to output video information to the display unit. In different embodiments, the video interface is implemented in different ways. For instance, in one example embodiment, the video interface is integrated into a motherboard of the computing device. In another example embodiment, the video interface is a video expansion card. In various embodiments, the display unit can be a cathode-ray tube display, an LCD display panel, a plasma screen display panel, a touch-sensitive display panel, an LED screen, a projector, or another type of display unit. In various embodiments, the video interface communicates with the display unit in various ways. For example, the video interface can communicate with the display unit via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The external component interface enables the computing device to communicate with external devices. In various embodiments, the external component interface is implemented in different ways. For example, the external component interface can be a USB interface, a FireWire interface, a serial port interface, a parallel port interface, a PS/2 interface, and/or another type of interface that enables the computing device to communicate with external devices. In different embodiments, the external component interface enables the computing device to communicate with different external components. For example, the external component interface can enable the computing device to communicate with external storage devices, input devices, speakers, phone charging jacks, modems, media player docks, other computing devices, scanners, digital cameras, a fingerprint reader, and other devices that can be connected to the computing device. Example types of external storage devices include, but are not limited to, magnetic tape drives, flash memory modules, magnetic disk drives, optical disc drives, flash memory units, zip disk drives, optical jukeboxes, and other types of devices comprising one or more computer storage media. Example types of input devices include, but are not limited to, keyboards, mice, trackballs, stylus input devices, keypads, microphones, joysticks, touch-sensitive display screens, and other types of devices that provide user input to the computing device.

The memory stores various types of data and/or software instructions. For instance, in one example, the memory stores a Basic Input/Output System (BIOS), and an operating system 416. The BIOS includes a set of software instructions that, when executed by the processing system, cause the computing device to boot up. The operating system includes a set of software instructions that, when executed by the processing system, cause the computing device to provide an operating system that coordinates the activities and sharing of resources of the computing device, including one or more possible software applications 418.

The systems and methods described herein result in specific technical efficiencies and practical applications. Generally, the systems and methods facilitate communication between parties (signers and customers) at various locations. The systems and methods further track such connections and allow for more efficient capture of sales information and shipping information for the items. Other advantages are possible.

Various examples of the systems and methods being implemented follow.

In one example, the National Football League (NFL) has a college player draft every year in April. The location changes each year, but the event is hosted at arenas across the United States, drawing between 20,000 to 50,000 attendees. In 2018, there were 256 players drafted. The arenas filled seats with the 256 players, their families, each of the 32 NFL teams' personnel, agents, coaches, season ticket holders and fans alike. Once a player is drafted, the player signs his contract with their NFL team live on air, poses on stage with the couch and the official hat and jersey for the respective team. Then the player is escorted off stage where they participate in a press conference with ESPN and other broadcasting networks.

The systems and methods described herein would allow the player (e.g., after the press conference) to enter a room where a live virtual signing event can take place. Fans, families and alumni could participate in the virtual signing event with the newest draft picks, buying signed items in real time. This would give fans, families and alumni the opportunity to purchase signed items from the players immediately and before they even step foot on the training grounds, pre-season and regular season. The price of the product/item/memorabilia can be priced appropriately (e.g., significantly higher) due to the opportunity to purchase the first collectibles from that player.)

In another example, a website allows celebrities to create custom messages for customers. A person can go on the website and spend $20-$400 for a custom message for themselves, friends or family. They put a request to the celebrity, pay the price set by the celebrity, and give guidelines of what the message should say. For example, the message can be a congratulations on a new job or a happy birthday message. Once the celebrity makes the message and sends to the customer they get paid for the message. The systems and methods described herein can be incorporated as part of or in leu of this process, by allowing the customer not only to pay for the personal message but also purchase an item with the message.

In yet another example, an author usually hosts signing events in bookstores across the country to launch a new book and boost sales. Now that bookstores may not be open, authors are not able to make the in-person connection with their readers. The systems and methods provided herein would allow the author to conduct a virtual signing event with customers and readers and be able to personalize messages. Customers would purchase the book in advance at a higher price for the signed copy of the book. Customers would be sent a special link to open on their internet browser for the live book signing for a specified date and time. Authors will sign books as they dedicate messages to each customer. The signed books will be shipped directly to the customer.

In another example, a musician releases a new album and plans to go on tour. Without the opportunity to tour and sell tickets the musician now can host one or more virtual signing events to sell albums to customers. The musician can sell a variety of items such as their album in CD or record version, tour merchandise such as T-shirts, sweatshirts, hoodies, keychains, stickers etc. The musician selects one or more date(s) for a virtual signing. The events can be done in the musician's home, studio or a production set. The customer will go on the musician's website, sign up for the virtual signing and purchase an item they wish to get signed. The customer will be sent a special link the day of the signing for he or she and them alone to access. When the musician comes on the virtual live event, they can sign items for the customer and deliver personal messages.

In another example, a company that hosts one or more large conventions (e.g., Comic-Con) every year. The company has agreements with celebrities and personalities from all backgrounds, such as movie stars in the latest Marvel movie, actors from TVs biggest shows such as Game of Thrones and Breaking Bad and many more. People flood the convention(s) hoping to stand in line and get an image or piece of memorabilia signed by that individual. Customers purchase the products in advance from an assortment of products chosen by the company, and the customers then stand in line and wait to meet the celebrities. The individual signs the item and poses for a picture. This ranges from $50-$300 per engagement depending on how famous the individual is. The systems and methods described herein would allow the company to host virtual conventions (e.g., virtual Comic-Cons) from anywhere in the world. Individuals can stay in their homes, signing items and memorabilia for fans/customers and customers can purchase the experience in advance.

Many alternatives are possible. For example, in one embodiment, the signing sessions are only available to journalists and comprise an interview for subsequent publication. In another alternative, the session is a professional consultation with the celebrity. In yet another example, the celebrity can exercise a veto, returning the purchase price if the celebrity is unhappy with the session and/or the request from the customer. In yet another embodiment, the interaction is recorded, and said recording is offered to the customer for purchase.

In another alternative embodiment, certain information/fields are restricted and only displayed to the signer. Said fields can include advertisements offered to the signer, such as targeted advertisements to a specific celebrity. The targeted advertisements can be for products and services to users, wherein the targeting is based on identities of celebrities viewed by said users.

Referring now to FIGS. 6-13, example graphical user interfaces for the system 100 are shown. In these examples, functionality associated with the system 100 is provided.

Figure 6:
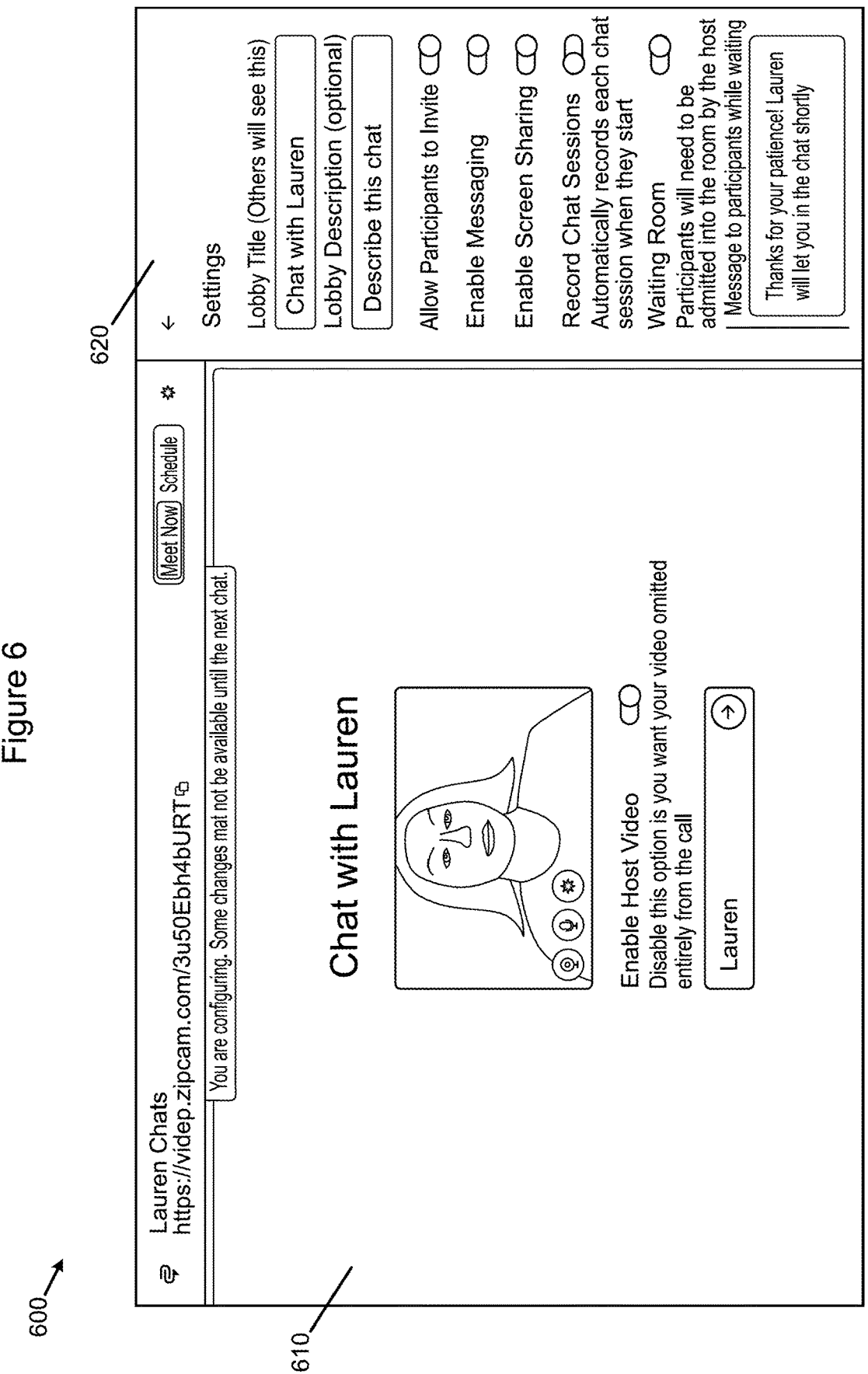
FIG. 6 shows an example user interface for configuring a virtual signing event.

Referring now to FIG. 6, an example interface 600 is shown for configuring a virtual signing event. In this example, the interface 600 includes a video window 610 that allows the host to enable video, sample the video feed, and define a name.

The interface 600 also includes a settings portion 620 that allows the host to customize the chat associated with the virtual signing event. The settings include allowing the host to define a title and description for the lobby area where customers participate in the virtual signing event. For instance, if the virtual signing event is associated with a sports start, the sport star's name and a description can be provided.

The settings portion 620 also allows the host to set other options, such as allowing customers to invite others to participate in the event. The options also allow the host to enable messaging and screen sharing between the sports start and the customers and also enable recording of the chat session by the customer. Finally, the options allow the host to enable a waiting room and message, where the customers wait before chatting with the sports star.

Figure 7:
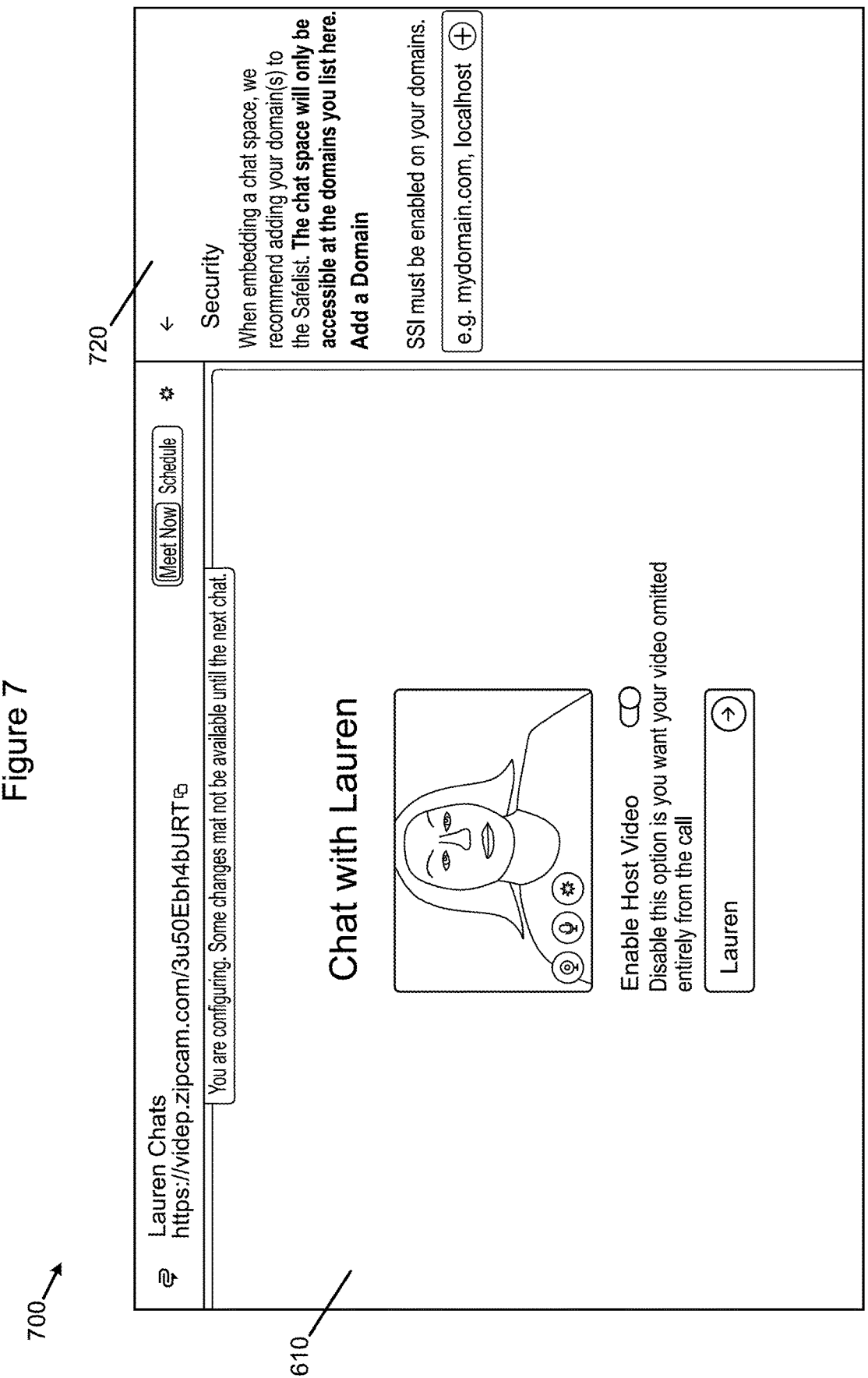
FIG. 7 shows an example user interface for defining security for a virtual signing event.
Figure 8:
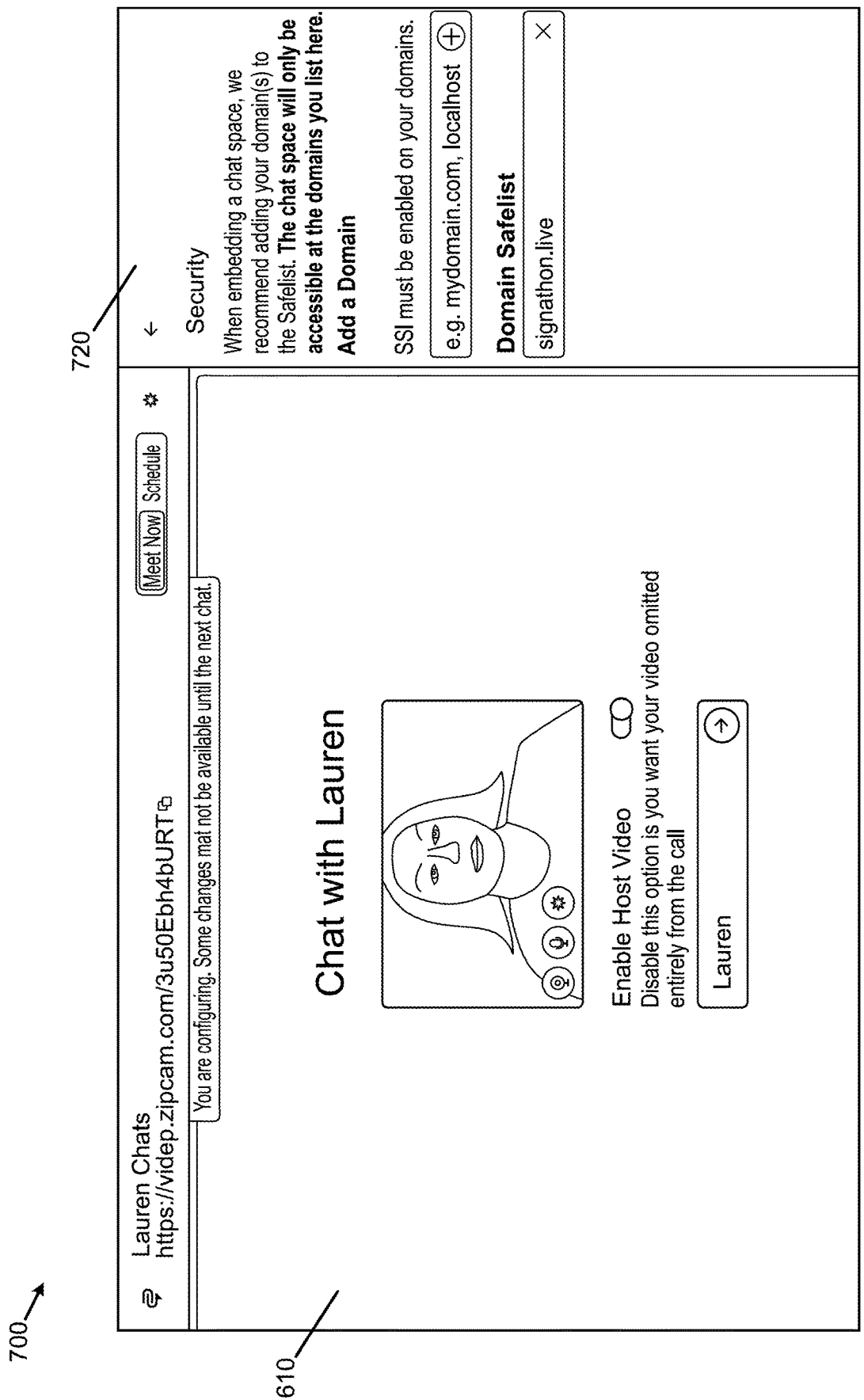
FIG. 8 shows another user interface for defining security for a virtual signing event.

Referring now to FIGS. 7-8, the system includes an interface 700 that allows the host to define security for the virtual signing event. At a settings portion 720, the host can define domains which can be used to embed the event associated with the virtual signing event, such as live video and/or live chat. In this example, the settings portion 720 allows the host to provide domains that are added to a safelist to allow embedding of the event. For instance, the host can input a domain (e.g., "signathon.live") to allow that domain to embed the event. See FIG. 8.

Figure 9:
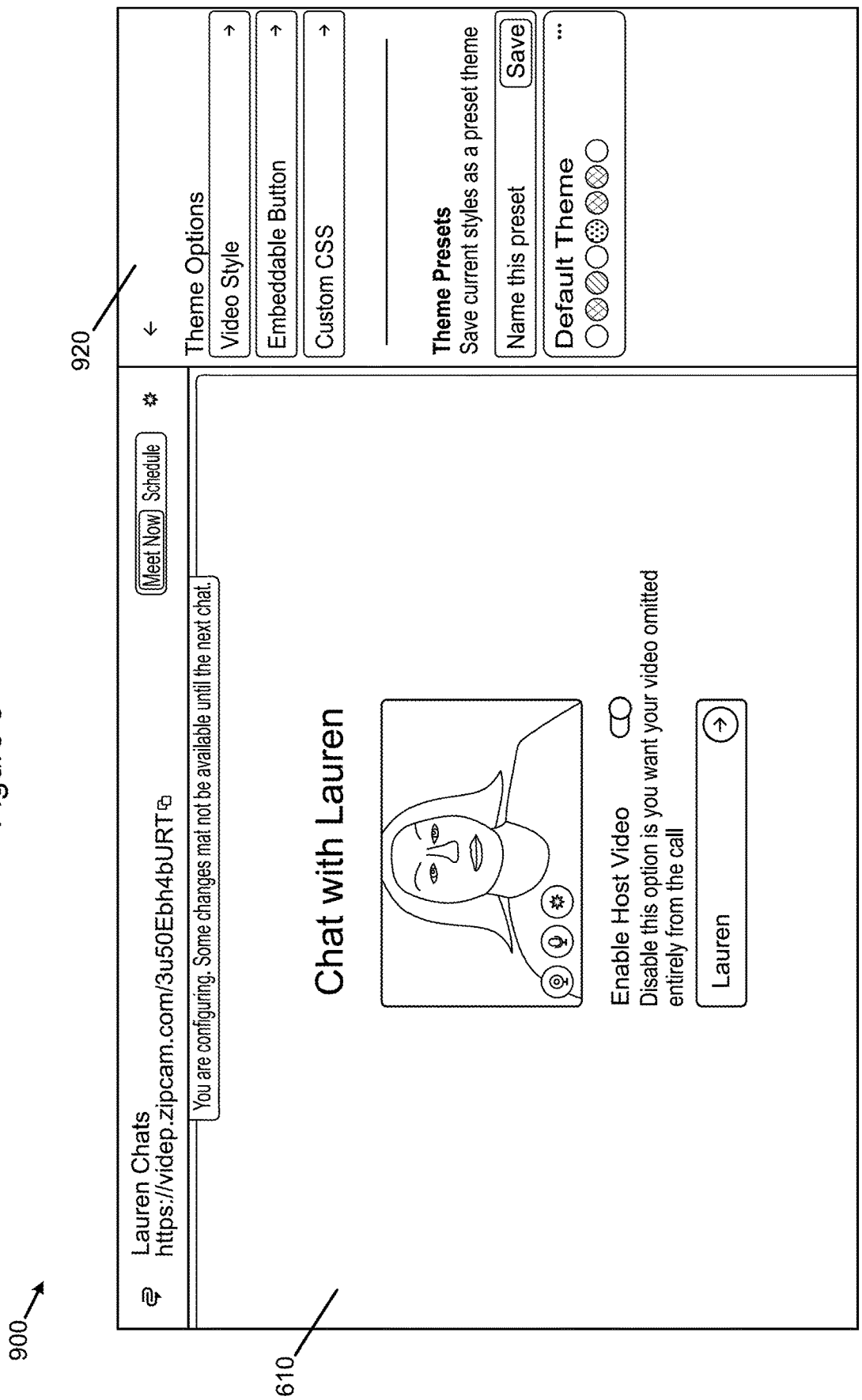
FIG. 9 shows an example user interface for defining a look of a virtual signing event.
Figure 10:
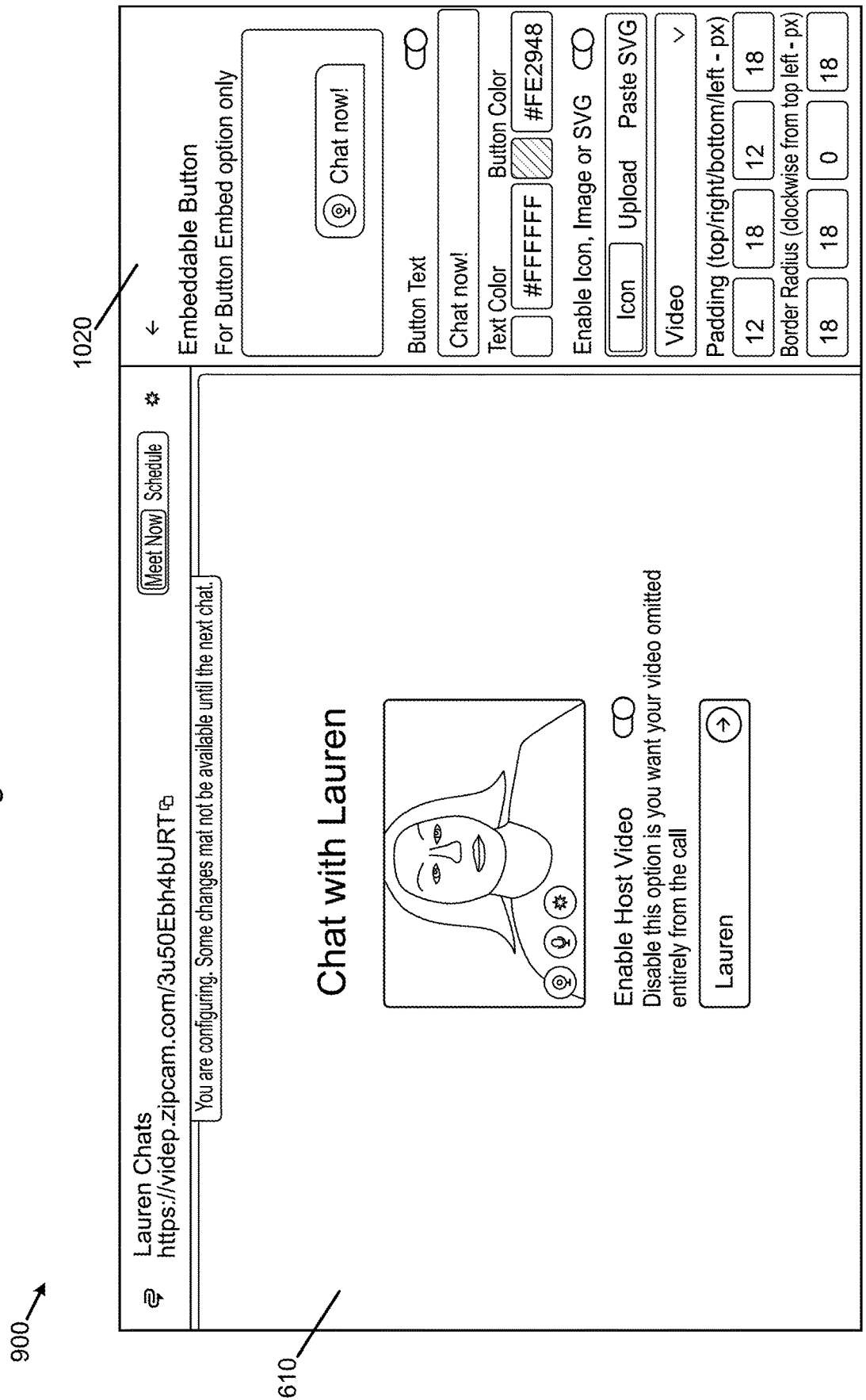
FIG. 10 shows another example user interface for defining a look of a virtual signing event.
Figure 11:
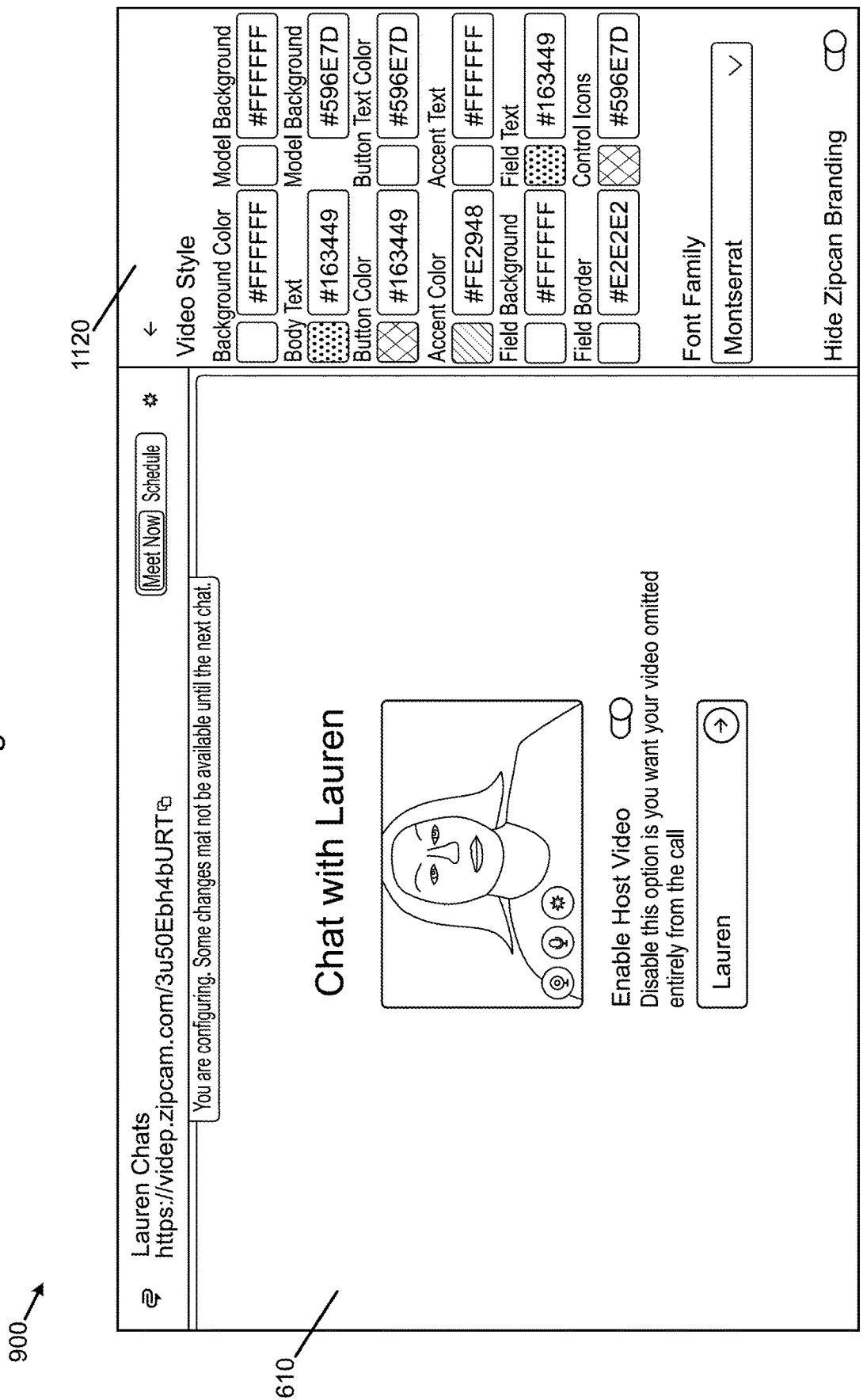
FIG. 11 shows another example user interface for defining a look of a virtual signing event.

Referring now to FIGS. 9-11, the host can define the look of the virtual signing event by selecting options associated with one or more themes.

For example, FIG. 9 shows an example user interface 900 with a settings portion 920 that allows the host to select certain looks for the virtual signing event. This allows the host to choose what colors to use, change fonts, add logos, and/or change embedded buttons. For instance, the settings portion 920 allows the host to select between video styles, as well as select the look and feel of the buttons that are embedded for the event. See FIG. 10. The settings portion 920 also allows the host to select between different color schemes for the event, as well as save the selections as a preset theme for future use.

Referring now to FIG. 10, the interface 900 shows a settings portion 1020 that allows the host to change the look and feel of the buttons that are embedded as controls for the virtual signing event. For instance, the button text ("Chat Now!") can be changed, along with the color for each button. Further, the shape of the button can be selected or an image uploaded to function as the button shape. Finally, the padding and border for the button can be defined.

Referring now to FIG. 11, the interface 900 shows a settings portion 1120 that allows the host to change the look and feel of the video associated with the virtual signing event. For instance, the host can change the color of the background and/or text associated with the video. Further, the host can choose a font for use with the text associated with the video.

Figure 12:
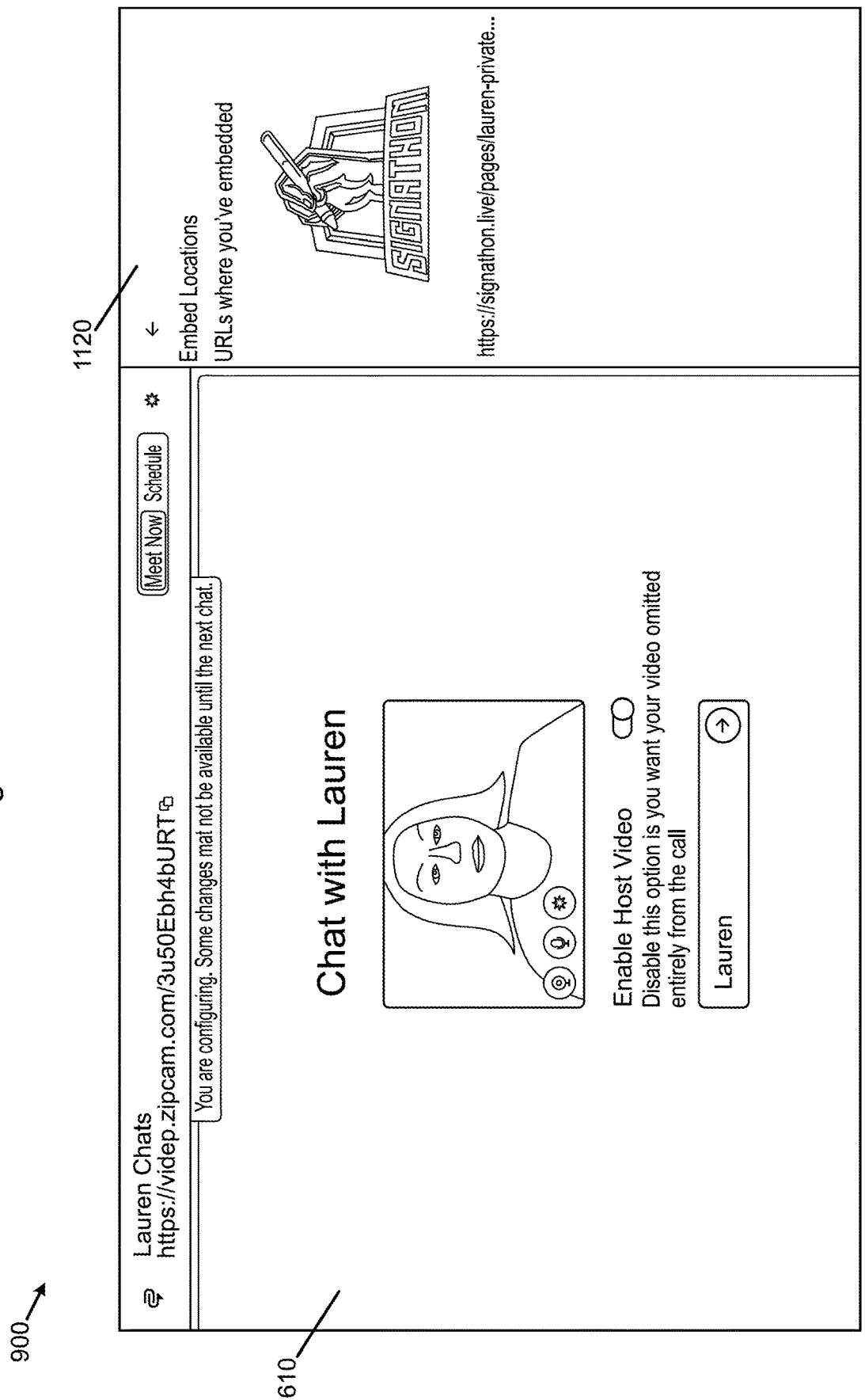
FIG. 12 shows an example user interface listing domains for which a virtual signing event has been registered.

Referring now to FIG. 12, an example interface 1200 is shown listing any domains in which the virtual signing event has been registered. Specifically, a settings portion 1220 lists the Uniform Resource Locators (URLs) that have been associated with the virtual signing event. As additional domains are added, code (see below) is embedded within a site associated with those domains and synchronized with the server 110.

More specifically, code can be added to a site hosted at the domain(s) listed in the settings portion 1220 to allow the virtual signing event to be conducted on the site. Example code for embedding is provided below.

```
<div style="position:fixed; top:75px; left: 0; right: 0; bottom: 0;
box-sizing: border-box;"><iframe id="zc-embed" width="100%"
height="100%" style="position:absolute; top:0; left:0; width:100%;
height:100%;" src="https://video.website.com/xxxxxxxxxxx"
frameborder="0" allow="autoplay; picture-in-picture; camera;
microphone; display-capture" allowfullscreen></iframe>
<script crossorigin="anonymous" async src="https://api.
website.com/iscript.js"></script></div>
```

In one example, the technology which allows the virtual signing event to be embedded into a site is provided is the Zipcan technology provided by Piggyback Inc. Other configurations are possible.

Figure 13:
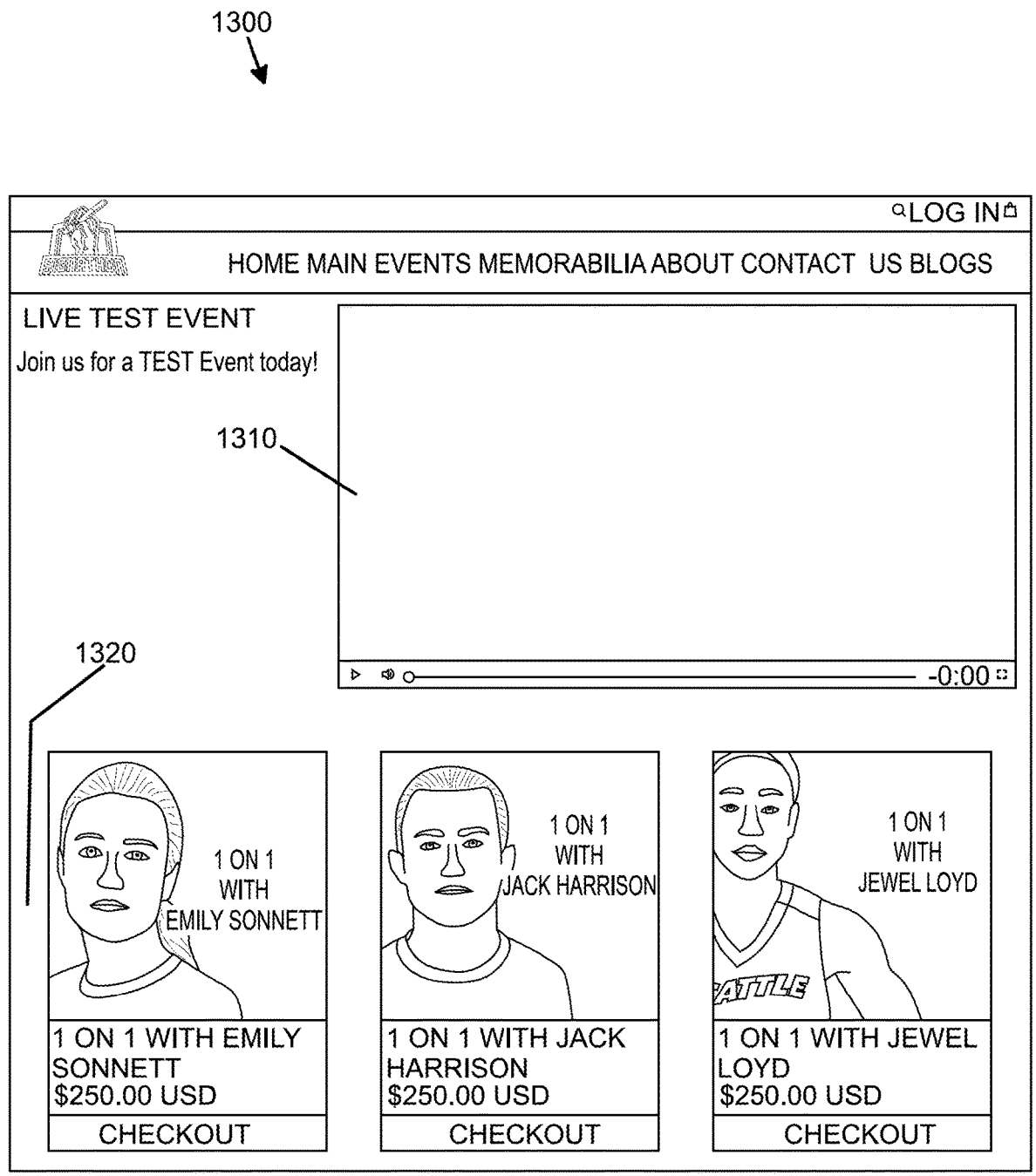
FIG. 13 shows an example user interface for broadcasting of a virtual signing event.

Referring now to FIG. 13, an example interface 1300 with a broadcast of a virtual signing event is shown. The virtual signing event can be accessed through a web site, as well as be streamed on other platforms, such as social media sharing platforms like Facebook Live, Instagram Live, and YouTube Live. With this interface 1300, customers can watch a live version of the virtual signing event at video window 1310, as well as shop at the same time at a section 1320 of the interface 1330.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A system whereby an individual applies a signature to a memorabilia item, the system comprising:
    a global positioning system sensor being associated with an individual;
    a processor;
    memory encoding instructions which, when executed by the processor, cause the processor to:
        establish a first video connection with the individual;
        establish a second video connection with a customer;
        connect the first video connection to the second video connection to facilitate a virtual face-to-face interaction between the individual and the customer;
        facilitate display of at least one physical item by the individual to the customer during the virtual face-to-face interaction;
        confirm signing of the at least one physical item by the individual during the virtual face-to-face interaction by allowing the customer to watch the individual sign the at least one physical item on the second video connection;
        receive a captured location of the individual during signing the physical item using the global positioning system sensor;
        store the location;
        incorporate the location into a certificate of authenticity for the at least one physical item; and facilitate shipping of the at least one physical item to the customer.

2. The system of claim 1, wherein the at least one physical item is associated with the individual.

3. The system of claim 1, wherein the memory encodes further instructions which, when executed by the processor, cause the processor to connect the first video connection to the second video connection at a predetermined time.

4. The system of claim 1, wherein the memory encodes further instructions which, when executed by the processor, cause the processor to offer further items to the customer to purchase.

5. The system of claim 4, wherein the further items are offered prior to and/or during the virtual face-to-face interaction.

6. The system of claim 1, wherein the memory encodes further instructions which, when executed by the processor, cause the processor to schedule a session with the customer such that said individual is obligated to interact with the customer during the session.

7. The system of claim 1, wherein the memory encodes further instructions which, when executed by the processor, cause the processor to allow aspects of the virtual face-to-face interaction to be customized.

8. The system of claim 7, wherein the aspects include a look of the virtual face-to-face interaction.

9. A method whereby an individual applies a signature to physical memorabilia, item and/or product, comprising of the steps of:
- establishing a direct interaction with a customer via video at a predetermined time in real time not recorded;
- allowing the individual to apply the signature to the physical memorabilia, item or product;
- allowing the individual to interact with the customer as the signature is applied to the physical memorabilia, item or product;
- allowing the individual to place a connotation and/or name;
- allowing the individual to display the physical memorabilia, item or product to the customer via the video to show authenticity, including:
  - allowing the customer to watch the individual sign the physical memorabilia on the second video connection;
  - determining a captured location of the individual during the signature using a global positioning system sensor associated with the individual;
  - storing the captured location; and
  - incorporating the captured location into a certificate of authenticity for the physical memorabilia; and
- shipping the physical memorabilia, item or product directly to the customer after the video.

* * * * *